US011281459B2

(12) United States Patent
Kolazhi et al.

(10) Patent No.: US 11,281,459 B2
(45) Date of Patent: *Mar. 22, 2022

(54) SAFE DEPLOYMENT OF CONFIGURATIONS TO SERVER FLEETS

(71) Applicant: Amazon Technologies, Inc., Seattle, WA (US)

(72) Inventors: Krishnan A Kolazhi, Kirkland, WA (US); Khawar Ali, Seattle, WA (US); Andrew Evenson, Seattle, WA (US); Yue Yu, Seattle, WA (US); Ruogu Zhang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/945,435

(22) Filed: Jul. 31, 2020

(65) Prior Publication Data

US 2020/0364043 A1    Nov. 19, 2020

Related U.S. Application Data

(63) Continuation of application No. 16/283,572, filed on Feb. 22, 2019, now Pat. No. 10,732,967.

(51) Int. Cl.
*G06F 9/44* (2018.01)
*G06F 8/71* (2018.01)
(Continued)

(52) U.S. Cl.
CPC ............... *G06F 8/71* (2013.01); *G06F 8/60* (2013.01); *G06F 8/65* (2013.01)

(58) Field of Classification Search
CPC ............... G06F 8/60; G06F 8/65; G06F 8/71
(Continued)

(56) References Cited

U.S. PATENT DOCUMENTS 7,206,817 B2 * 4/2007 Fanshier .................. G06F 8/61
709/208
7,627,503 B1    12/2009 Champagne et al.
(Continued)

OTHER PUBLICATIONS

Hosek et al., "Safe Software Updates via Multi-version Execution", 2013, IEEE, pp. 612-621. (Year: 2013).*
(Continued)

*Primary Examiner* — Ted T. Vo
(74) *Attorney, Agent, or Firm* — Robert C. Kowert; Kowert, Hood, Munyon, Rankin & Goetzel, P.C.

(57) ABSTRACT

Methods, systems, and computer-readable media for safe deployment of configurations to server fleets are disclosed. A host processes requests to a service according to a control versions of a first configuration and a second configuration. After receiving an experimental version of the first configuration, a host processes some requests to the service according to the control versions of the first configuration and the second configuration, and other requests according to the experimental version of the first configuration and the control version of the second configuration. The experimental version of the first configuration is approved or rejected based at least in part on performance of the service. The host then processes some requests to the service according to the experimental version of the first configuration and the control version of the second configuration, and other requests according to the experimental versions of the first configuration and the second configuration.

20 Claims, 9 Drawing Sheets

(51) Int. Cl.
*G06F 8/60* (2018.01)
*G06F 8/65* (2018.01)

(58) Field of Classification Search
USPC .............. 717/101–102, 120–122, 168–173
See application file for complete search history.

(56) References Cited

U.S. PATENT DOCUMENTS

| | | | |
|---|---|---|---|
| 8,676,753 B2 | 3/2014 | Sivasubramanian et al. | |
| 8,677,315 B1 * | 3/2014 | Anderson | G06F 9/4411 717/110 |
| 9,235,409 B1 | 1/2016 | Guo et al. | |
| 9,413,604 B2 | 8/2016 | Kowalski et al. | |
| 9,426,026 B2 | 8/2016 | Rider | |
| 9,590,849 B2 | 3/2017 | Shakirzyanov et al. | |
| 9,696,982 B1 * | 7/2017 | Michalik | G06F 8/65 |
| 9,716,624 B2 | 7/2017 | Zeyliger et al. | |
| 9,916,233 B1 * | 3/2018 | Qureshi | G06F 9/45533 |
| 9,940,114 B2 * | 4/2018 | Mantripragada | G06F 11/3616 |
| 10,002,011 B2 | 6/2018 | Lissack | |
| 10,084,722 B2 | 9/2018 | Iyer et al. | |
| 10,091,055 B2 | 10/2018 | Sundaram et al. | |
| 10,122,578 B1 | 11/2018 | Magerramov et al. | |
| 10,148,695 B2 | 12/2018 | Krishnaprasad | |
| 10,162,619 B1 | 12/2018 | Lanner et al. | |
| 10,178,152 B2 | 1/2019 | Bitincka et al. | |
| 10,482,062 B1 | 11/2019 | Muniswamy Reddy et al. | |
| 10,732,967 B1 | 8/2020 | Kolazhi et al. | |
| 2008/0171588 A1 * | 7/2008 | Atashband | G07F 17/323 463/20 |
| 2020/0081867 A1 | 3/2020 | Muniswamy Reddy et al. | |

OTHER PUBLICATIONS

Malkhi et al., "Persistent objects in the Fleet system", 2001, IEEE, pp. 126-136. (Year: 2001).*

* cited by examiner

SAFE DEPLOYMENT OF CONFIGURATIONS TO SERVER FLEETS

BACKGROUND

This application is a continuation of U.S. patent application Ser. No. 16/283,572, filed Feb. 22, 2019, which is hereby incorporated by reference herein in its entirety.

Many companies and other organizations operate distributed systems that interconnect numerous computing systems and other computing resources to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. As the scale and scope of typical distributed systems has increased, the tasks of provisioning, administering, and managing the computing resources have become increasingly complicated.

Such a distributed system may encompass numerous subsystems that work in concert. For example, a distributed system operated by an online store may include an ordering system that processes customer orders of goods and/or services. When an order is placed or modified, numerous services, processes, or subsystems may be invoked to perform various operations related to the order. For example, the payment type may be verified, the delivery address may be verified, the inventory may be updated, and so on. Such operations may be implemented using multiple service instances or other computing resources, and the operations may be performed according to configurations that control runtime behavior. However, configurations may change over time, and improperly deployed configuration changes may cause service outages that impact the entire ordering system.

Figure 1A:
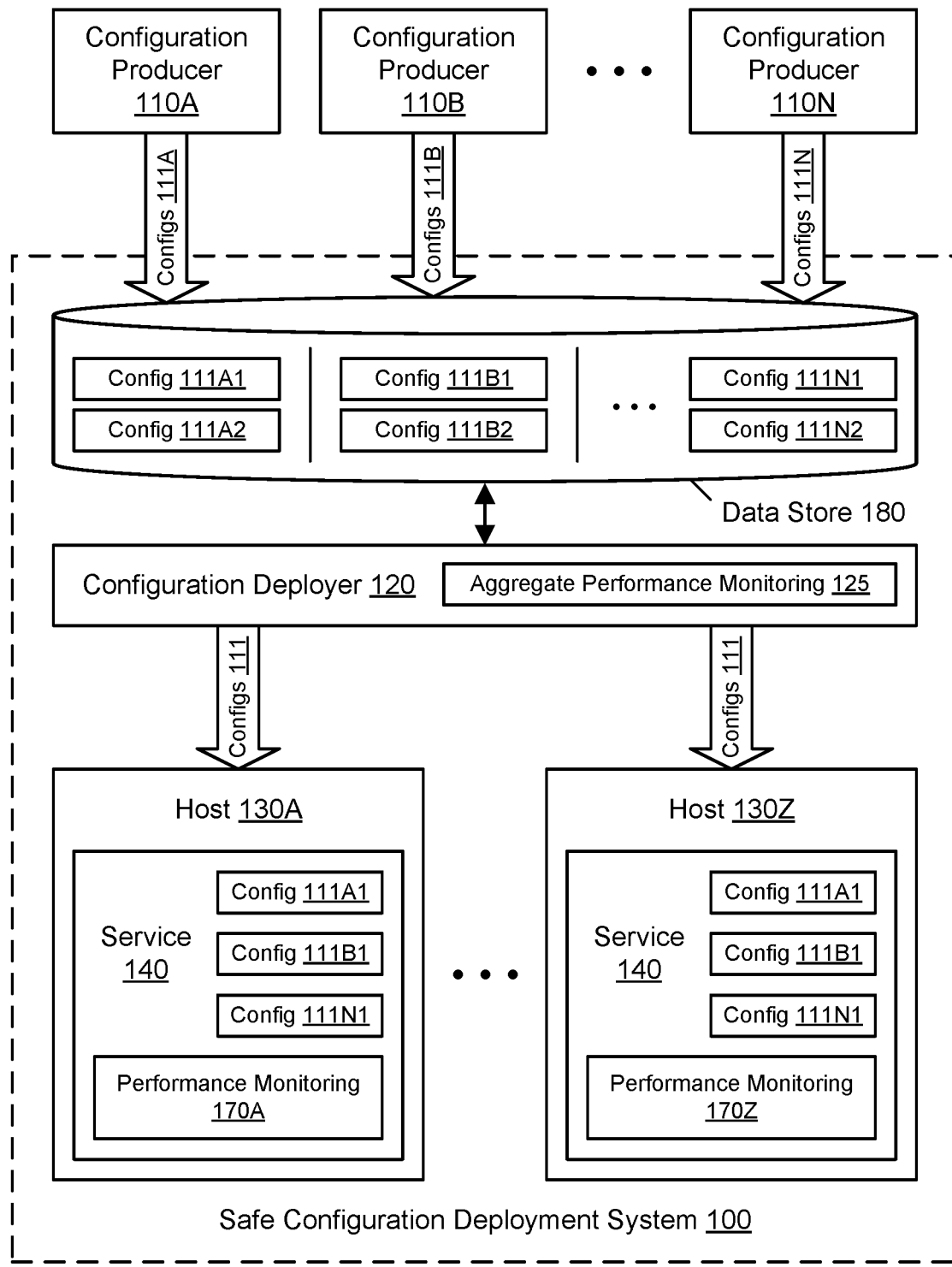
FIG. 1A and FIG. 1B illustrate an example system environment for safe deployment of configurations to server fleets, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must").

Similarly, the words "include," "including," and "includes" mean "including, but not limited to."

DETAILED DESCRIPTION OF EMBODIMENTS

Various embodiments of methods, systems, and computer-readable media for safe deployment of configurations to server fleets are described. The operation of a service or process as executed at a host (also referred to as a server) may be controlled by a configuration associated with that service or process. In prior approaches to configuration deployment, a new version of a configuration was initially provided to a relatively small percentage of hosts in a fleet. Each host with the new version would then use that version exclusively to perform tasks controlled by the configuration, such that the existing version of the configuration was not used at these hosts but was used by the remainder of the fleet. The percentage of hosts with the new version would gradually be increased until the version was deployed to the entire fleet. However, in scenarios where producers of configurations were decoupled from consumers of configurations, problems could arise. For example, new versions of two configurations could be deployed and tested concurrently on some hosts in the fleet without a way to properly assess the impact of individual configuration changes. As a result, errors or poor performance arising from one new configuration could be misattributed to the other new configuration. As another example, some producers may have rolled out a new configuration to the entire fleet at once (or to large percentage of the fleet), and a faulty configuration deployed in such a manner could cause a significant service outage across much or all of the fleet.

As described herein, configurations from many producers may be safely deployed to hosts whose operations are controlled by the configurations. In a scenario where multiple producers provide configuration changes that are consumed by single hosts, the responsibility of safely deploying and testing new configurations may be shifted from producers to consumers. A host (consumer) may execute one or more services or processes according to a plurality of different configurations from many producers. A new version of one configuration may be tested across the entire fleet of hosts while other configurations remain unchanged. Configuration changes may be tested one after another rather than concurrently in order to isolate the performance impact of changes. A new version of a configuration may be gradually exposed to more and more traffic at each host in the fleet, while the remainder of traffic is processed according to an older version of the configuration. The performance of the new version may be assessed in comparison to the old version, and the new version may be exposed to a greater and greater percentage of traffic via gradual dialup if no performance problems are detected. Eventually the new version may be approved for full deployment to the hosts, such that the old version of the configuration is replaced at the hosts. The new configuration may be rejected and one or more hosts may be rolled back to the old version of the configuration if a sufficiently negative performance impact is observed. After one configuration change is accepted or rejected, another configuration change may then be tested at the hosts with the gradual dialup. Using these techniques, multiple configurations may be deployed to single consumers in a manner that permits individual configuration changes to be analyzed accurately while mitigating service outages and other negative impacts of configuration changes.

As one skilled in the art will appreciate in light of this disclosure, embodiments may be capable of achieving certain technical advantages, including some or all of the following: (1) improving the availability and performance of computer systems during deployment of new configurations by gradually increasing the exposure of configuration changes on a host-by-host basis; (2) improving the accuracy of configuration testing by isolating the testing of a change to one configuration from changes to other configurations; (3) improving the accuracy of configuration testing by producing independent streams of metrics for a control configuration and a candidate configuration; (4) improving the availability of individual computer systems by performing local rollback of problematic configurations; (5) preventing fleet-wide service outages by using centralized monitoring of configuration changes with potential fleet-wide rollback; and so on.

Figure 1B:
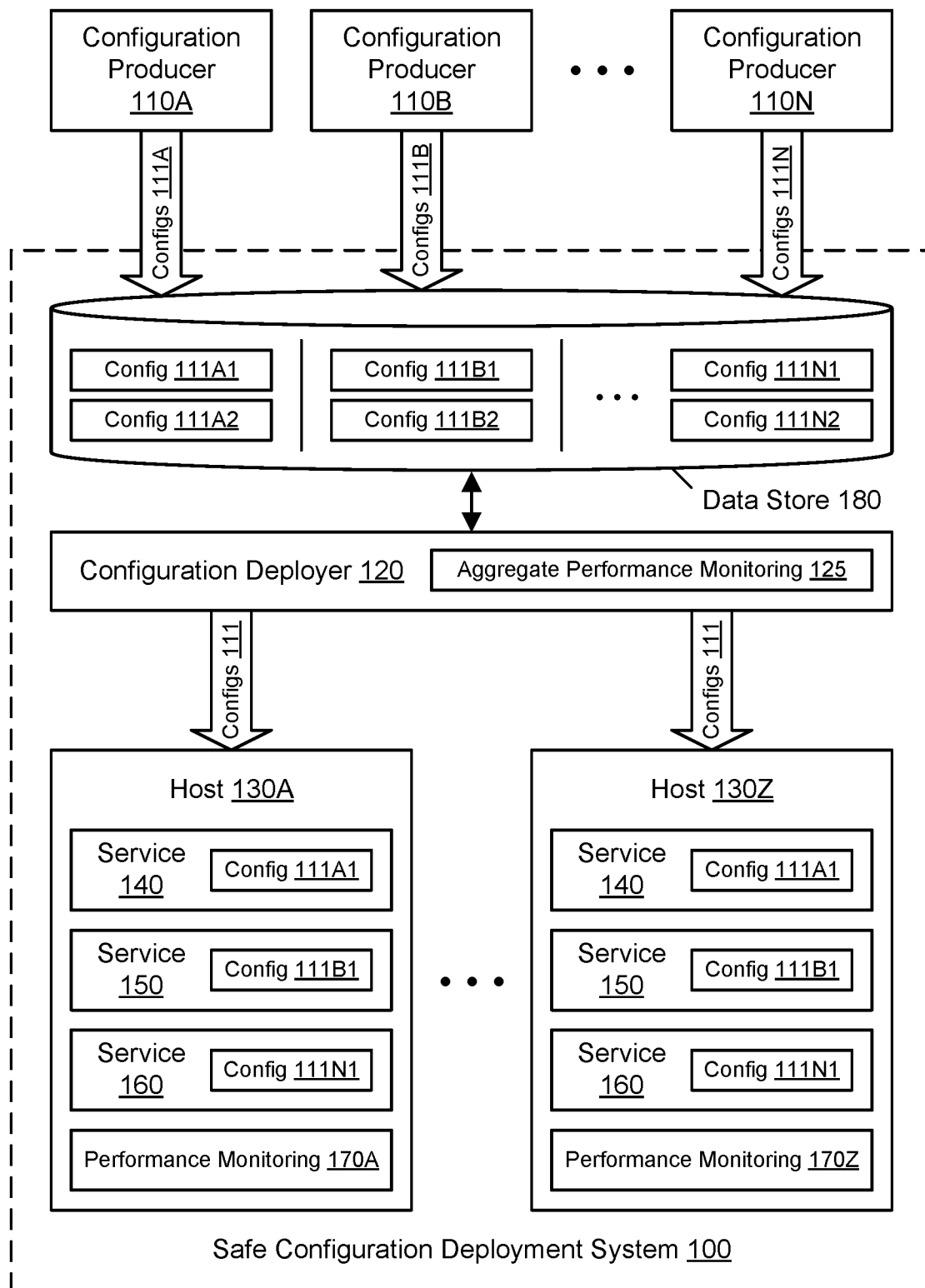

FIG. 1A and FIG. 1B illustrate an example system environment for safe deployment of configurations to server fleets, according to some embodiments. In one embodiment, a safe configuration deployment system 100 may be used to safely deploy hundreds or thousands of configurations. A change in a configuration may produce a change in the operation of a service or process. For example, a configuration may control the input(s) expected to an operation, the output(s) produced by the operation, the manner in which the output(s) are generated using the input(s), and so on. As another example, changes in one or more configurations may alter a dependency graph that represents dependency relationships between various services. As yet another example, changes in a configuration may alter the circumstances or frequency at which a service should be invoked. In some embodiments, configurations may include operational "knobs" such as endpoints, timeouts, throttling limits, replay ratios, and so on. In some embodiments, configurations may include launch flags (to enable or disable features), business specific configurations (e.g., quantity validation rule limits.), and so on. In some embodiments, a configuration may include business logic that can be executed by a service.

In one embodiment, the safe configuration deployment system 100 may be used to safely deploy configurations from one producer or many producers (e.g., hundreds or thousands). As shown in the example of FIG. 1A and FIG. 1B, the producers may include producers 110A and 110B through 110N. A centralized configuration deployer 120 may coordinate the deployment of configurations from many producers to one or more fleets of hosts. As shown in the example of FIG. 1A and FIG. 1B, a fleet of hosts may include host 130A through 130Z. Each host may run one or more services (or processes), each of whose runtime operations are controlled by one or more configurations. As shown in FIG. 1A, for example, each host 130A through 130Z may execute a service 140 according to a configuration 111A1, according to a configuration 111B1, and also according to a configuration 111N1. As shown in FIG. 1B, for example, each host 130A through 130Z may execute a first service 140 according to a configuration 111A1, a second service 150 according to a configuration 111B1, and a third service 160 according to a configuration 111N1.

In one embodiment, a host may implement a plugin engine that consumes and executes plugins. In one embodiment, the plugin engine may be responsible for performing various tasks associated with taking and processing orders to an online store. For example, one plugin may set a payment method associated with an order, another plugin may set a delivery address associated with an order, yet another plugin may update the store's inventory, and so on. In one embodiment, as illustrated in FIG. 1A, a plugin engine or host may include one service or process that consumes many configurations. In one embodiment, as illustrated in FIG. 1B, a plugin engine or host may include many services or processes that each consume one or more configurations. The plugins may themselves represent configurations. The plugins may be provided by many producers, and the producers may represent different teams or divisions within an enterprise or other business entity. The different teams or divisions may not necessarily coordinate with one another to deploy new versions of configurations. The safe configuration deployment system 100 may shift the burden of safely managing configuration changes from producers of configurations to consumers of configurations.

Configuration producers 110A-110N may update a data store 180 that maintains versions of configurations provided by the producers. For example, producer 110A may provide configurations 111A including one version 111A1 and another version 111A2, producer 110B may provide configurations 111B including one version 111B1 and another version 111B2, and producer 110N may provide configurations 111N including one version 111N1 and another version 111N2. In one embodiment, the data store 180 may maintain only the newest version of a configuration. In one embodiment, the data store 180 may maintain a plurality of versions of a given configuration, e.g., to enable comparisons between different versions and/or rollback to an earlier version. After providing a new version of a configuration to the data store 180, potentially along with metadata for configuration testing such as a dialup rate and/or performance thresholds and alarms, the role of a configuration producer may be complete with respect to deployment of that version. The configuration producer may be unaware of when and how the new version is rolled out to the fleet and gradually dialed up across the fleet. In one embodiment, the configuration producer may be provided with metrics and other results of the deployment of the new version of the configuration, e.g., by a configuration deployer 120 that performs aggregate performance monitoring 125 of the fleet 130A-130Z. In one embodiment, the configuration producer may be alerted if the new version of the configuration is rejected, e.g., if the performance impact of the new version is sufficiently negative.

In one embodiment, new versions of configurations in the data store 180 may be deployed to hosts by conventional deployment tools. In one embodiment, the configuration deployer 120 may monitor the data store 180 for new versions of configurations as provided by the configuration producers. When a new version of a configuration is detected, the configuration deployer 120 may provide the new version to the entire fleet of hosts that execute the corresponding service or process. The configuration deployer 120 may provide one or more configurations 111 at a time to each host, but in one embodiment, only one new configuration may be tested at a time on the hosts. At each host, the amount of traffic exposed to the new configuration being tested may be gradually increased or "dialed up" over time until the new version is accepted or rejected. Meanwhile, an older version of the configuration may be used at these hosts to process the remainder of the traffic. For example, at one stage of the testing at a given host, the new version may be used to process 10% of incoming requests while the old version is used to process 90% of the incoming requests. At the next stage of the testing at a given host, the new version may be used to process 20% of incoming requests while the old version is used to process 80% of the incoming requests. A configuration may be dialed up at the same rate or at different rates across different hosts. The older version of a configuration may have been previously tested and approved and may be referred to as a control version. The new version of a configuration may be untested and may be referred to as an experimental version or a candidate version. In some embodiments, an experimental version of one configuration may be dialed up and assessed while the same fleet of hosts is executing the same service or other services according to other configurations. The system 100 may thus be used to safely manage configuration changes one at a time for a plurality of configurations that are in concurrent use at multiple hosts.

At each stage, performance metrics may be collected at each host in order to assess the impact of the new configuration. As shown in FIG. 1A and FIG. 1B, each host may include a component for performance monitoring of local services, such as performance monitoring 170A at host 130A and performance monitoring 170Z at host 130Z. In one embodiment, the performance monitoring 170A-170Z may be implemented as part of a service, e.g., service 140. One or more metrics collected or generated by the performance monitoring 170A-170Z may be reported to a centralized component, such as the aggregate performance monitoring 125. In various embodiments, the aggregate performance monitoring 125 may be implemented as part of the configuration deployer 120 or independently of the configuration deployer 120. Different streams of metrics may be captured for an experimental configuration and a control configuration. For example, the error rate, throughput, processor utilization, memory utilization, and/or other metrics associated with a service or process using an experimental configuration may be collected during the dialup of the configuration. In one embodiment, the metrics may be collected for the experimental configuration and compared to baseline metrics for the control configuration. In one embodiment, the metrics may be collected for both the experimental configuration and the control configuration during the dialup, and at least two streams or channels of metrics may be maintained for comparison of the experimental configuration to the control configuration. The experimental configuration may be dialed up to a larger and larger proportion of requests at a host until it is rejected or approved for full deployment based on the performance monitoring. If the metrics for the experimental version are acceptable relative to the control version, then the experimental version may be dialed up to a larger percentage of traffic at each host. The metrics may be assessed relative to performance thresholds, and alarms may be triggered if performance is sufficiently negative. Performance thresholds and alarms associated with configuration dialup may be determined per configuration by configuration producers, e.g., different teams that manage the various plugins executed by a plugin engine. In one embodiment, a dialup rate and/or other dialup metadata may be determined per configuration by configuration producers. If the experimental version is dialed up to a sufficiently high percentage (e.g., 80%) of traffic without causing performance problems or violating service-level agreements (SLAs), then the version may be approved for full deployment (100% of traffic). When an experimental version of a configuration is approved (e.g., based on dialup and performing monitoring), the version may become the new control version of the configuration.

In one embodiment, gradual dialup of a configuration may be implemented in a centralized manner based on aggregated metrics from multiple hosts, e.g., using the aggregate performance monitoring 125 at the configuration deployer 120 or another centralized component. For example, using the centralized component, each host in the fleet may be instructed to increase the percentage of traffic exposed to a new configuration in a substantially concurrent manner. In one embodiment, approval of a configuration may be performed in a centralized manner based on aggregated metrics 125 from multiple hosts. In one embodiment, rejection of a configuration may be performed in a centralized manner based on aggregated metrics 125 from multiple hosts. In one embodiment, an experimental version may be locally rejected at a given host (and the control version returned to processing 100% of traffic) if the configuration has a sufficiently negative impact on performance. For example, if a new configuration is so problematic that it threatens to cause a service outage, the host may locally reject the configuration without having to wait for a centralized decision to be made and implemented. Rejection of an experimental configuration may result in the control version being exposed to 100% of traffic to eliminate any use of the experimental version.

Each host in the fleet may include a client library (or other local component) that manages the dialup. The client library may enable localized control over the dialup of configurations. The client library may include various controls that implement safe deployment of new configurations at the consumer level such that producers need not be responsible for safe deployment. For example, one control may permit the host to dialup only one configuration at a time; new versions of other configurations may be queued for dialup or otherwise delayed. As another example, a control in the client library may permit only N changes at a time to be accepted in one configuration or in multiple configurations. As a further example, a control in the client library may cease testing of any new configurations for a given window of time or until further notice, e.g., to lock in existing functionality during an anticipated period of heavy traffic. As yet another example, a control in the client library may permit one new configuration (or configuration changes) to be tested at a given time or may instead permit multiple new configurations (or configuration changes) to be tested at a given time.

It is contemplated that the system 100 may include additional components not shown, fewer components than shown, or different combinations, configurations, or quantities of the components shown. The system 100 may comprise one or more computing devices, any of which may be implemented by the example computing device 3000 illustrated in FIG. 8. In various embodiments, portions of the system 100 may be provided by the same computing device or by any suitable number of different computing devices. If any of the components of the system 100 are implemented using different computing devices, then the components and their respective computing devices may be communicatively coupled, e.g., via a network. Each of the illustrated components may represent any combination of software and hardware usable to perform their respective functions.

The configuration producers 110A-110N may represent different processes, systems, and/or computing devices. The configuration producers 110A-110N may be distributed on multiple computing devices throughout one or more networks, including private networks and/or public networks such as the Internet. The configuration producers 110A-110N may also be coupled to the system 100 through one or more networks, including private networks and/or public networks such as the Internet. The configuration producers 110A-110N may interact with the data store 180 or other components of the system 100 using one or more suitable interfaces, such as one or more application programming interfaces (APIs), e.g., to invoke the functionality of the system 100 for safe deployment of configurations. The hosts 130A-130Z may be distributed on multiple computing devices throughout one or more networks, including private networks and/or public networks such as the Internet. In one embodiment, at least some of the functionality of the system 100 may be implemented as a library of functions, and the hosts 130A-130Z may represent implementations of the library.

In one embodiment, the functionality of the system 100 may be provided to producers 110A-110N and other clients as a web-accessible service. The functionality of the system 100 may be presented to clients using a provider network. A network set up by an entity such as a company or a public sector organization to provide one or more services (such as various types of cloud-based computing or storage) accessible via the Internet and/or other networks to a distributed set of clients may be termed a provider network. A provider network may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

Figure 2:
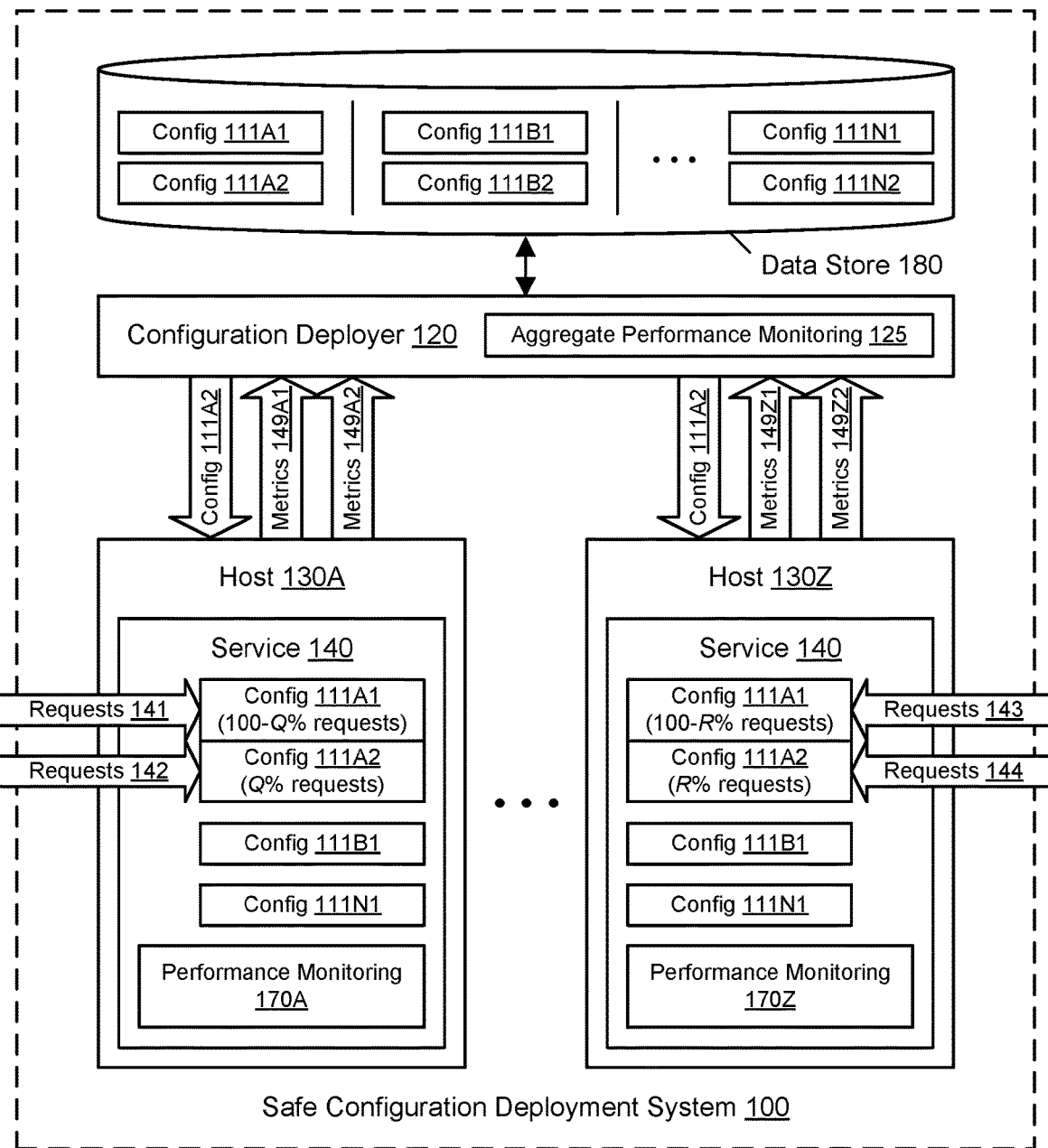
FIG. 2 illustrates further aspects of the example system environment for safe deployment of configurations to server fleets, including an example of configuration deployment for a first configuration at a fleet of hosts, according to some embodiments.

FIG. 2 illustrates further aspects of the example system environment for safe deployment of configurations to server fleets, including an example of configuration deployment for a first configuration at a fleet of hosts, according to some embodiments. As discussed above, one configuration change or new configuration at a time may be tested via gradual dialup across a fleet of hosts 130A-130Z. For example, configuration 111A2 may represent a newer or experimental version in comparison to configuration 111A1, configuration 111B2 may represent a newer or experimental version in comparison to configuration 111B1, and configuration 111N2 may represent a newer or experimental version in comparison to configuration 111N1. In one embodiment, the experimental versions 111A2, 111B2, and 111N2 may be ready for deployment and testing at the same time. However, only one at a time may be deployed to the fleet 130A-130Z for gradual dialup. In the example shown in FIG. 2, the new configuration 111A2 may be deployed to the fleet first, and the other new configurations 111B2 and 111N2 may be queued or their testing otherwise delayed until after the new configuration 111A2 is accepted or rejected based on its gradual dialup.

The new configuration 111A2 may control the operation of a particular service 140. To initiate the gradual dialup, incoming requests to the service 140 may be partitioned into two sets at each host. At host 130A, the total requests may be partitioned into requests 141 and requests 142. At host 130Z, the total requests may be partitioned into requests 143 and requests 144. The requests 141 and 143 may be processed according to the old or control version of the configuration 111A1, while the requests 142 and 144 may be processed according to the new or experimental version of the configuration 111A2. The proportion of requests assigned to the new version may initially represent a relatively small percentage (e.g., 10%) of the total request volume to the service 140. For example, the requests 142 may represent Q% of the total request volume at host 130A, the requests 141 may represent (100−Q)% of the total request volume at host 130A, the requests 144 may represent R% of the total request volume at host 130Z, and the requests 143 may represent (100−R)% of the total request volume at host 130Z. In various embodiments, Q and R may represent the same percentage or different percentages. In one embodiment, the configuration deployer 120 may dictate Q and R. In one embodiment, Q and R may be determined locally by the respective hosts 130A and 130Z. In one embodiment, Q and R may be determined based (at least in part) on a dialup rate or other dialup metadata supplied by the configuration producer.

Each host may collect or generate performance metrics associated with the configuration testing during the gradual dialup. For example, host 130A may collect or generate metrics 149A1 descriptive of the performance of the service 140 according to the configuration 111A1 and metrics 149A2 descriptive of the performance of the service 140 according to the configuration 111A2. Similarly, host 130Z may collect or generate metrics 149Z1 descriptive of the performance of the service 140 according to the configuration 111A1 and metrics 149Z2 descriptive of the performance of the service 140 according to the configuration 111A2. The metrics 149A1, 149A2, 149Z1, and 149Z2 may be reported to an aggregate performance monitoring component 125. Based (at least in part) on the aggregate performance monitoring 125, the percentage of traffic exposed to the new configuration may be increased again and again until the new configuration is approved or rejected. Accordingly, Q and R may potentially increase in magnitude one or more times according to a dialup rate associated with the configuration. For example, the proportion of traffic exposed to the new configuration 111A2 may increase from 10% to 20% to 30%, and so on, until Q and R get sufficiently close to 100 (without causing performance problems) to deem the new configuration acceptable to replace the old version. However, if the performance of the new configuration 111A2 is sufficiently worse than the performance of the old configuration 111A1, e.g., by negatively impacting performance 5% or more or by tripping an alarm, then the new configuration may be rejected. If the new configuration 111A2 is rejected, then 100% of the request volume to the service 140 may again be processed according to the old configuration 111A1.

Figure 3:
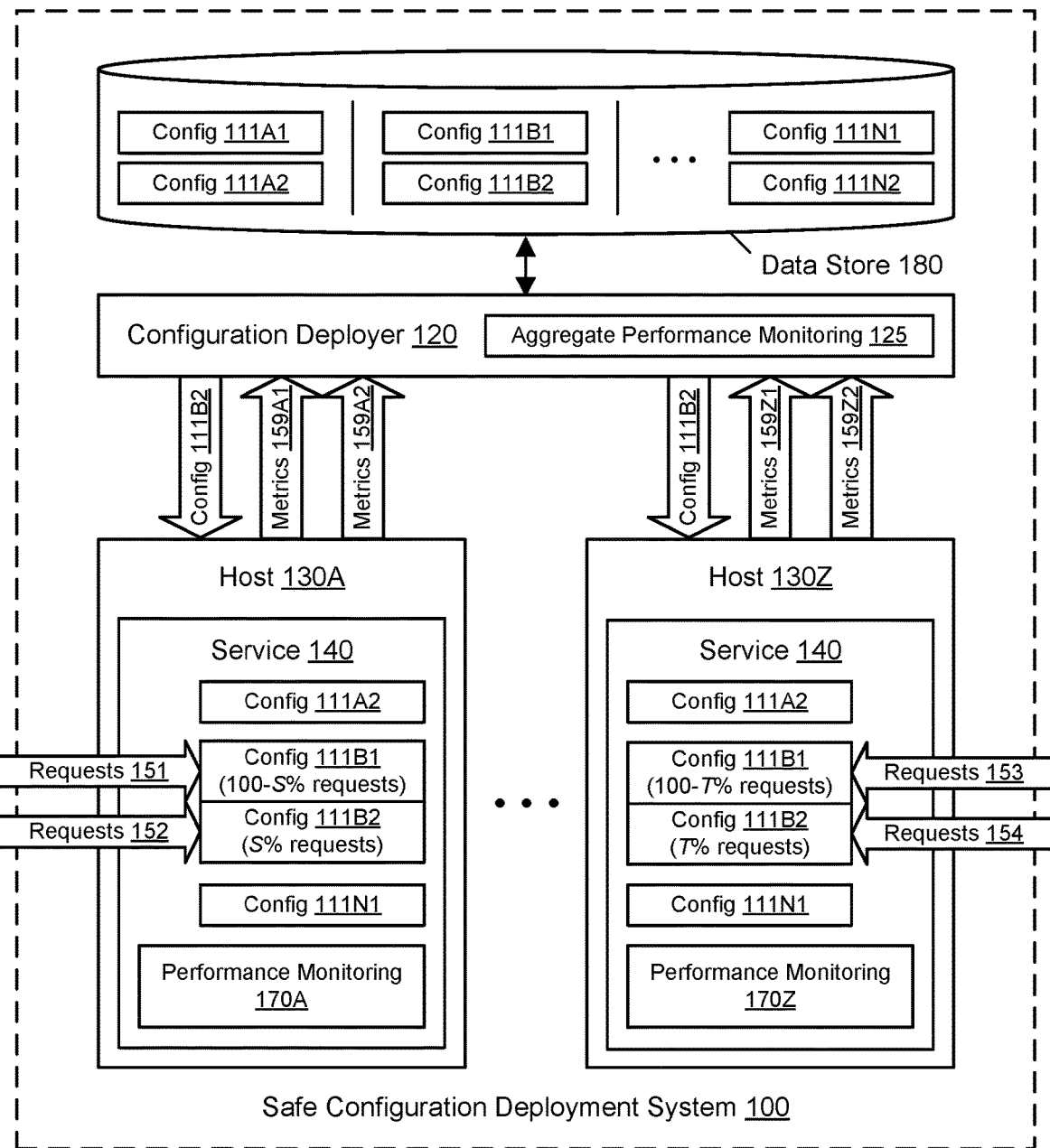
FIG. 3 illustrates further aspects of the example system environment for safe deployment of configurations to server fleets, including an example of configuration deployment for a second configuration at a fleet of hosts, according to some embodiments.

While the service 140 is undergoing gradual dialup with its new configuration 111A2, control versions of other configurations may remain unchanged during the gradual dialup. For example, each host may also execute service 140 according to configuration 111B1 and according to configuration 111N1. The gradual dialup of the new versions 111B2 and 111N2 may be queued or delayed until after the new configuration 111A2 is accepted or rejected. As shown in the example of FIG. 2 and FIG. 3, the new configuration 111A2 may be accepted and may completely supplant the old version 111A1. The new version 111A2 may then become a control version of the particular configuration.

FIG. 3 illustrates further aspects of the example system environment for safe deployment of configurations to server fleets, including an example of configuration deployment for a second configuration at a fleet of hosts, according to some embodiments. The example of FIG. 3 may represent a continuation of the example of FIG. 2 at a later point in time. As discussed above, the new configuration 111A2 for service 140 may be approved based on a gradual dialup across the fleet with performance monitoring and performance analysis relative to the control version of the configuration. After the configuration 111A2 is approved, a new configuration 111B2 for the service 140 may be subjected to testing with gradual dialup across the fleet 130A-130Z.

The new configuration 111B2 may control the operation of a particular service 140. To initiate the gradual dialup, incoming requests to the service 140 may be partitioned into two sets at each host. At host 130A, the total requests may be partitioned into requests 151 and requests 152. At host 130Z, the total requests may be partitioned into requests 153 and requests 154. The requests 151 and 153 may be processed according to the old or control version of the configuration 111B1, while the requests 152 and 154 may be processed according to the new or experimental version of the configuration 111B2. The proportion of requests assigned to the new version may initially represent a relatively small percentage (e.g., 10%) of the total request volume to the service 140. For example, the requests 152 may represent S% of the total request volume at host 130A, the requests 151 may represent (100−S)% of the total request volume at host 130A, the requests 154 may represent T% of the total request volume at host 130Z, and the requests 153 may represent (100−T)% of the total request volume at host 130Z. In various embodiments, S and T may represent the same percentage or different percentages. In one embodiment, the configuration deployer 120 may dictate S and T In one embodiment, S and T may be determined locally by the respective hosts 130A and 130Z. In one embodiment, S and T may be determined based (at least in part) on a dialup rate or other dialup metadata supplied by the configuration producer.

Each host may collect or generate performance metrics associated with the configuration testing during the gradual dialup. For example, host 130A may collect or generate metrics 159A1 descriptive of the performance of the service 140 according to the configuration 111B1 and metrics 159A2 descriptive of the performance of the service 140 according to the configuration 111B2. Similarly, host 130Z may collect or generate metrics 159Z1 descriptive of the performance of the service 140 according to the configuration 111B1 and metrics 159Z2 descriptive of the performance of the service 140 according to the configuration 111B2. The metrics 159A1, 159A2, 159Z1, and 159Z2 may be reported to an aggregate performance monitoring component 125. Based (at least in part) on the aggregate performance monitoring 125, the percentage of traffic exposed to the new configuration may be increased again and again until the new configuration is approved or rejected. Accordingly, S and T may potentially increase in magnitude one or more times according to a dialup rate associated with the configuration. For example, the proportion of traffic exposed to the new configuration 111B2 may increase from 10% to 20% to 30%, and so on, until S and T get sufficiently close to 100 (without causing performance problems) to deem the new configuration acceptable to replace the old version. However, if the performance of the new configuration 111B2 is sufficiently worse than the performance of the old configuration 111B1, e.g., by negatively impacting performance 5% or more or by tripping an alarm, then the new configuration may be rejected.

While the service 140 is undergoing gradual dialup with its new configuration 111B2, control versions of other configurations may remain unchanged during the gradual dialup. For example, each host may also execute service 140 according to configuration 111A2 and according to configuration 111N1. The gradual dialup of the new version 111N2 may be queued or delayed until after the new configuration 111B2 is accepted or rejected. As shown in the example of FIG. 3 and FIG. 4, the new configuration 111B2 may be rejected, and 100% of the request volume to the service 140 may again be processed according to the old configuration 111B1.

Figure 4:
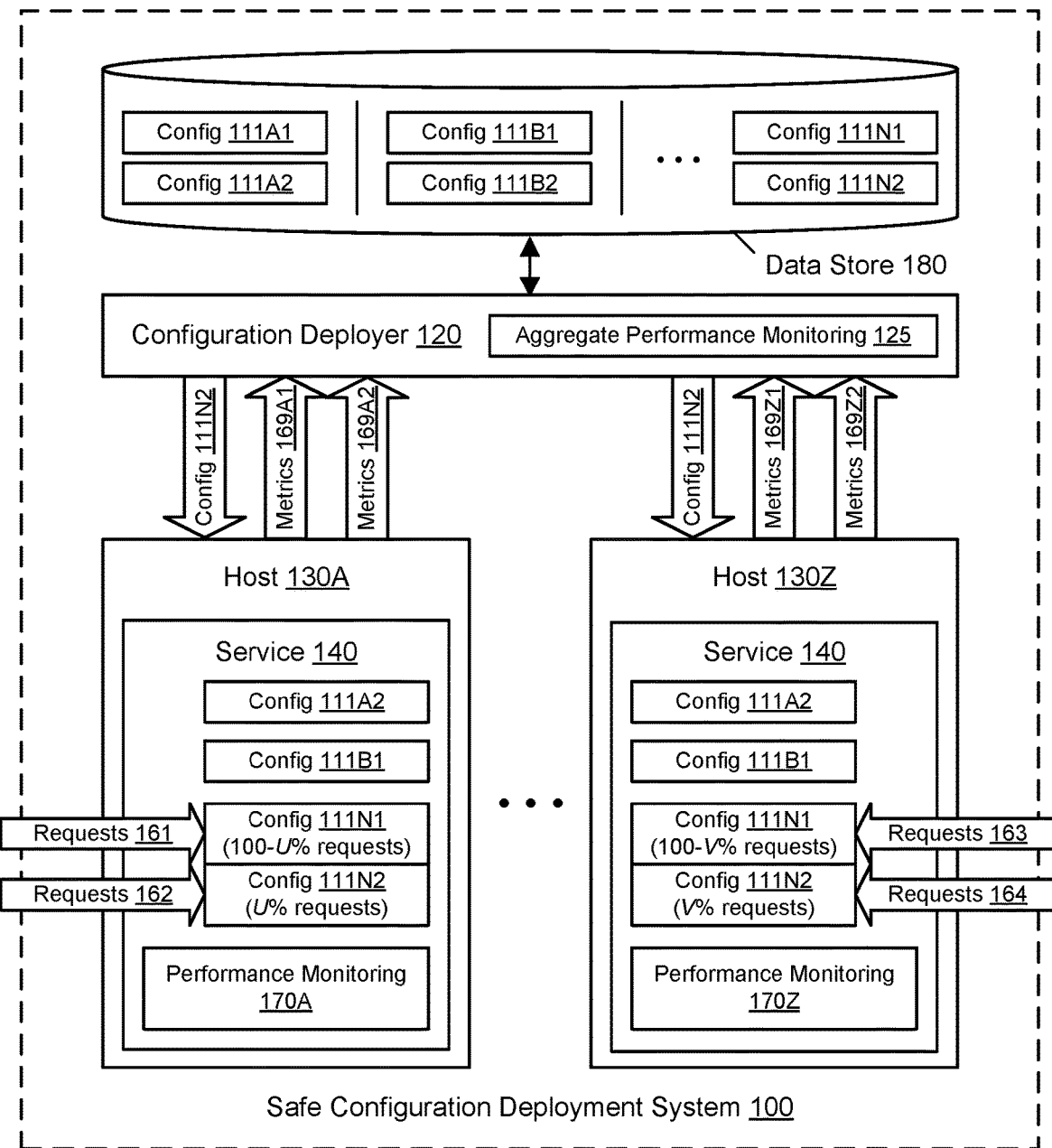
FIG. 4 illustrates further aspects of the example system environment for safe deployment of configurations to server fleets, including an example of configuration deployment for a third configuration at a fleet of hosts, according to some embodiments.

FIG. 4 illustrates further aspects of the example system environment for safe deployment of configurations to server fleets, including an example of configuration deployment for a third configuration at a fleet of hosts, according to some embodiments. The example of FIG. 4 may represent a continuation of the example of FIG. 4 at a later point in time. As discussed above, the new configuration 111B2 for service 140 may be rejected based on a gradual dialup across the fleet with performance monitoring and performance analysis relative to the control version of the configuration. After the configuration 111B2 is rejected, a new configuration 111N2 for the service 140 may be subjected to testing with gradual dialup across the fleet 130A-130Z.

The new configuration 111N2 may control the operation of a particular service 140. To initiate the gradual dialup, incoming requests to the service 140 may be partitioned into two sets at each host. At host 130A, the total requests may be partitioned into requests 161 and requests 162. At host 130Z, the total requests may be partitioned into requests 163 and requests 164. The requests 161 and 163 may be processed according to the old or control version of the configuration 111N1, while the requests 162 and 164 may be processed according to the new or experimental version of the configuration 111N2. The proportion of requests assigned to the new version may initially represent a relatively small percentage (e.g., 10%) of the total request volume to the service 160. For example, the requests 162 may represent U% of the total request volume at host 130A, the requests 161 may represent (100−U)% of the total request volume at host 130A, the requests 164 may represent V% of the total request volume at host 130Z, and the requests 163 may represent (100−V)% of the total request volume at host 130Z. In various embodiments, U and V may represent the same percentage or different percentages. In one embodiment, the configuration deployer 120 may dictate U and V. In one embodiment, U and V may be determined locally by the respective hosts 130A and 130Z. In one embodiment, U and V may be determined based (at least in part) on a dialup rate or other dialup metadata supplied by the configuration producer.

Each host may collect or generate performance metrics associated with the configuration testing during the gradual dialup. For example, host 130A may collect or generate metrics 169A1 descriptive of the performance of the service 140 according to the configuration 111N1 and metrics 169A2 descriptive of the performance of the service 140 according to the configuration 111N2. Similarly, host 130Z may collect or generate metrics 169Z1 descriptive of the performance of the service 140 according to the configuration 111N1 and metrics 169Z2 descriptive of the performance of the service 140 according to the configuration 111N2. The metrics 169A1, 169A2, 169Z1, and 169Z2 may be reported to an aggregate performance monitoring component 125. Based (at least in part) on the aggregate performance monitoring 125, the percentage of traffic exposed to the new configuration may be increased again and again until the new configuration is approved or rejected. Accordingly, U and V may potentially increase in magnitude one or more times according to a dialup rate associated with the configuration. For example, the proportion of traffic exposed to the new configuration 111N2 may increase from 10% to 20% to 30%, and so on, until U and V get sufficiently close to 100 (without causing performance problems) to deem the new configuration acceptable to replace the old version. However, if the performance of the new configuration 111N2 is sufficiently worse than the performance of the old configuration 111N1, e.g., by negatively impacting performance 5% or more or by tripping an alarm, then the new configuration may be rejected.

While the service 140 is undergoing gradual dialup with its new configuration 111N2, control versions of other configurations may remain unchanged during the gradual dialup. For example, each host may also execute service 140 according to configuration 111A2 and according to configuration 111B1. The gradual dialup of new versions of other configurations may be queued or delayed until after the new configuration 111N2 is accepted or rejected.

Figure 5:
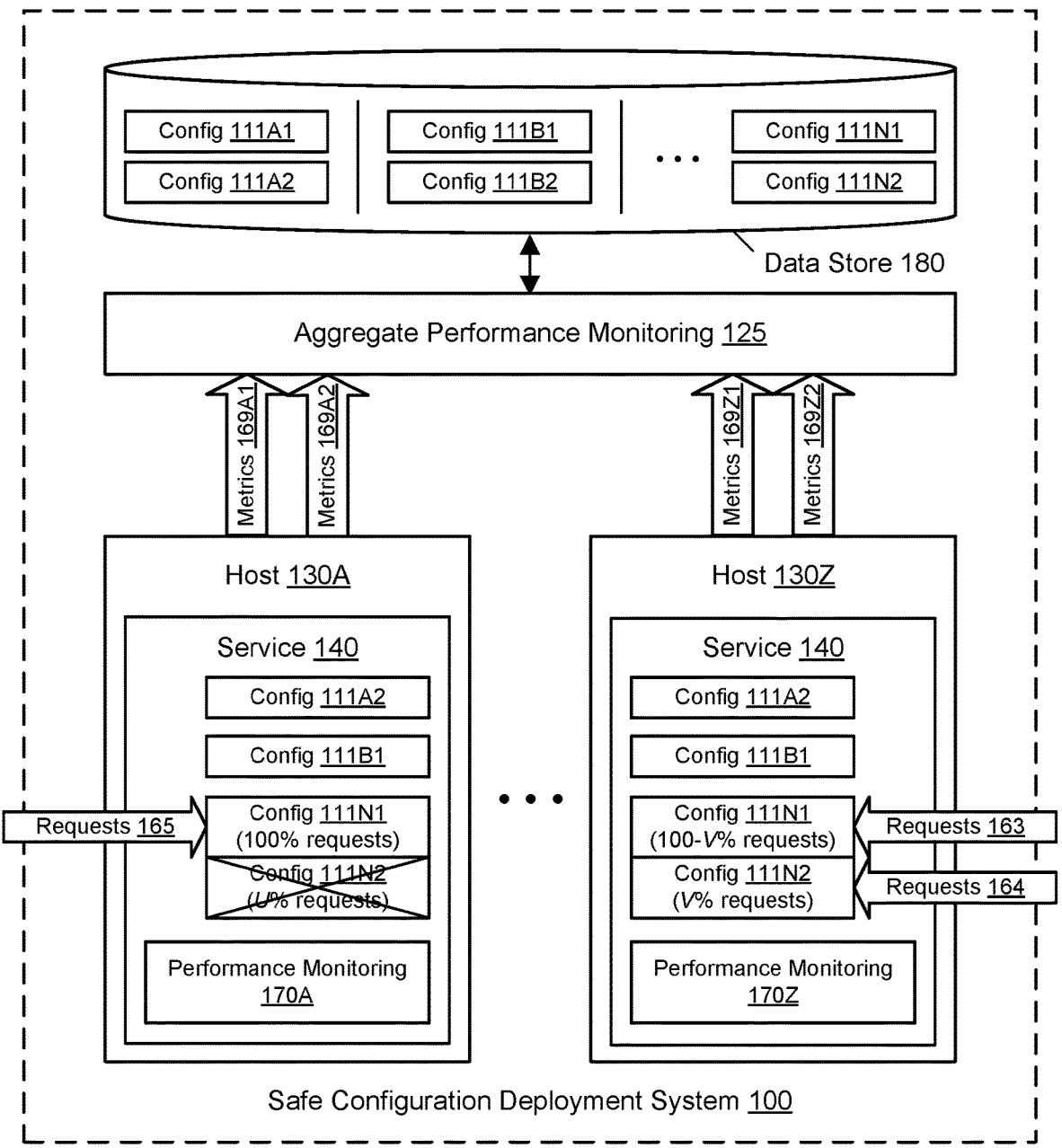
FIG. 5 illustrates further aspects of the example system environment for safe deployment of configurations to server fleets, including localized configuration rejection at an individual host, according to some embodiments.

FIG. 5 illustrates further aspects of the example system environment for safe deployment of configurations to server fleets, including localized configuration rejection at an individual host, according to some embodiments. In one embodiment, the new configuration 111N2 for service 140 may be rejected at one or more hosts, such as host 130A, based (at least in part) on local performance monitoring and local decision-making. After the experimental configuration 111N2 is rejected, 100% of the request volume 165 to the service 140 may be processed according to the control version 111N1. In one embodiment, an experimental version may be locally rejected at a given host (and the control version returned to processing 100% of traffic) if the configuration has a sufficiently negative impact on performance. For example, if a new configuration 111N2 is so faulty or lacking in performance that it threatens to cause a service 140 outage at the host 130A, or negatively impact other services 140 and 150, then the host 130A may locally reject the configuration without having to wait for a centralized decision to be made and implemented based on the aggregate performance monitoring 125.

In one embodiment, a centralized component such as the aggregate performance monitoring 125 may make a final decision for approval or rejection of the tested configuration across the fleet and may potentially override the local rejection shown in FIG. 5. For example, if only the host 130A rejects the configuration 111N2, but numerous other hosts do not reject the configuration, then the aggregate performance monitoring 125 may approve the configuration for full deployment to the entire fleet, including host 130A. However, if a sufficiently large number (e.g., a majority) of individual hosts reject the configuration 111N2, then the aggregate performance monitoring 125 may reject the configuration for full deployment to the entire fleet, including host 130Z.

Figure 6:
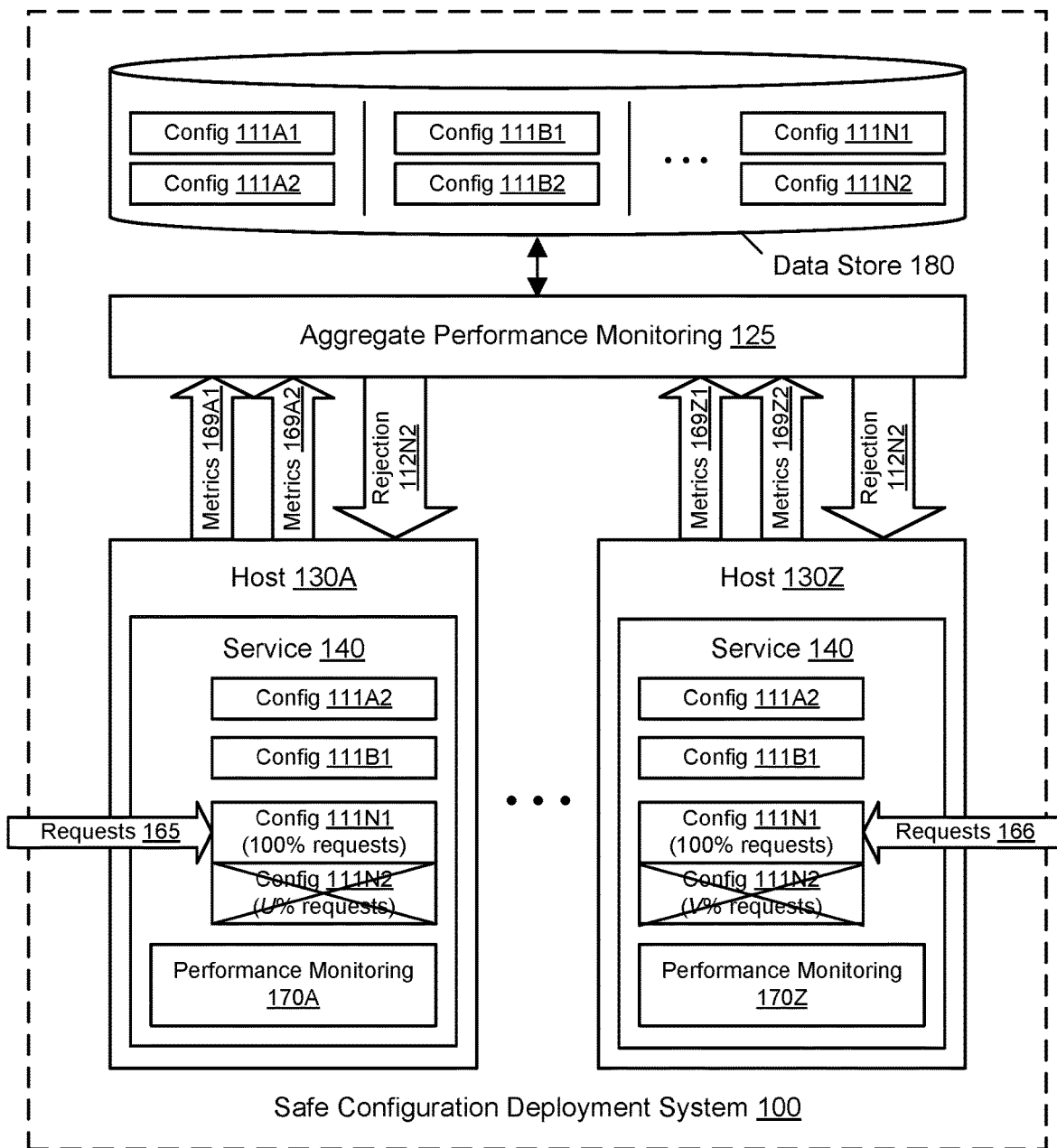
FIG. 6 illustrates further aspects of the example system environment for safe deployment of configurations to server fleets, including centralized configuration rejection for a fleet of hosts, according to some embodiments.

FIG. 6 illustrates further aspects of the example system environment for safe deployment of configurations to server fleets, including centralized configuration rejection for a fleet of hosts, according to some embodiments. In one embodiment, the new configuration 111N2 for service 140 may be rejected at the entire fleet of hosts 130A-130Z based (at least in part) on centralized performance monitoring 125 and centralized decision-making. In one embodiment, rejection of the configuration 111N2 may be performed in a centralized manner based on aggregated metrics from multiple hosts 130A-130Z. For example, the configuration 111N2 may be rejected if the aggregate metrics indicate that the configuration reduces performance (according to one or more metrics) by 5% or more across the fleet in comparison to the control version 111N1. After deciding to reject the new configuration, a component such as the aggregate performance monitoring 125 may sent a rejection 112N2 to each host in the fleet. In response to the rejection 112N2, 100% of the request volumes 165 and 166 to the service 140 at the respective hosts 130A and 130Z may be processed according to the control version 111N1. In one embodiment, the aggregate performance monitoring 125 or the configuration deployer 120 may also implement rollback of a configuration to an earlier version in a similar manner. For example, if a bug is discovered in configuration 111A2 after the configuration has been in service for several days or weeks, then the configuration deployer 120 may rollback the entire fleet to the earlier version 111A1.

Figure 7:
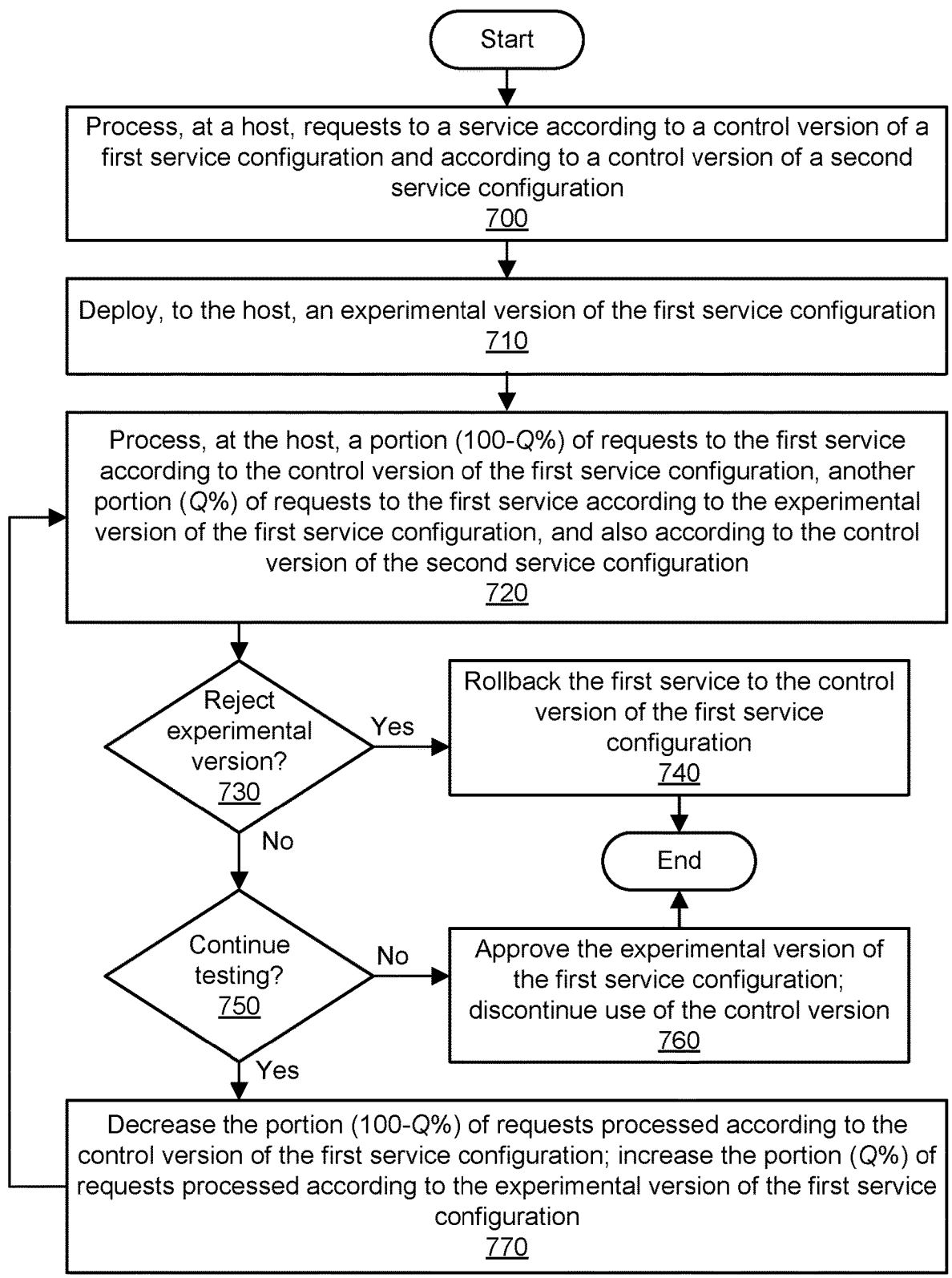
FIG. 7 is a flowchart illustrating a method for safe deployment of configurations to server fleets, according to some embodiments.

FIG. 7 is a flowchart illustrating a method for safe deployment of configurations to server fleets, according to some embodiments. As shown in 700, one or more services (or processes) may be executed at each host in a fleet. At a given host, incoming requests to a service may be processed according to a control version of a first service configuration. The first service configuration affects the operation of the service. For example, the first service configuration may determine the inputs to the service, the outputs of the service, other services called by the service, the way in which the service generates outputs based on inputs, and so on. Using the same service or a different service, a given host may process requests according to a control version of a second service configuration. The second service configuration affects the operation of a service. For example, the second service configuration may determine the inputs to the service, the outputs of the service, other services called by the service, the way in which the service generates outputs based on inputs, and so on. The control versions may have been previously tested (e.g., for performance) and approved for deployment to production hosts in a fleet.

As shown in 710, an experimental version of the first service configuration may be deployed to the hosts in the fleet. The experimental version may cause the service to operate in a different manner than the control version. A centralized component such as a configuration deployer may provide the configuration to each host. The configuration deployer may continuously check a data store of configurations for updates provided by configuration providers and may queue those updates for deployment to the fleet. The configuration deployer and/or hosts may ensure that only one experimental configuration version is deployed and tested at a given time. Pending updates to other configurations may be queued or otherwise delayed for deployment until the testing of the experimental version of the first service configuration is complete.

As shown in 720, at a given host in the fleet, the experimental version may be exposed to a portion of incoming requests to the service. For example, 10% of the request volume to the service may be processed according to the experimental version. The remainder (e.g., 90%) of the request volume may be processed according to the control version of the first service configuration. Concurrently, requests to the service at the given host may also be processed according to the control version of the second service configuration. Performance metrics may be collected for the service as executed according to the experimental version and also as executed according to the control version. The metrics may be used to dial up the percentage of requests exposed to the experimental version or reject the experimental version (and rollback to the control version).

As shown in 730, the method may determine whether to reject the experimental version. The experimental version may be rejected based (at least in part) on analysis of the corresponding performance metrics. For example, the experimental version may be rejected if its metrics indicate a sufficiently worse performance than the metrics for the control version, e.g., if throughput is reduced by at least 5%. The basis for rejection may be determined by the provider of the configuration and may be applied to aggregate performance metrics from many hosts in the fleet. As another example, the experimental version may be rejected if its metrics trigger an alarm, e.g., if the performance of the service with the experimental version drops significantly below a baseline performance. The alarm may be triggered at a given host, such that the host need not necessarily wait for a centralized component to aggregate and analyze metrics from other hots.

As shown in 740, if the experimental version is rejected, then the service may be rolled back to the control version of the first service configuration. If the experimental version is rejected by a centralized component, then the entire fleet may be rolled back. If the experimental version is rejected locally by a particular host, then only the host may be rolled back. Rollback may cause the first service to discontinue processing any requests according to the experimental version. Instead the control version may be used for processing of 100% of requests to the first service. After the rejection and rollback, a change to another configuration may be deployed to the fleet for testing via gradual dialup.

As shown in 750, if the experimental version is not rejected, then the method may determine whether to continue testing the experimental version. If testing is complete, then as shown in 760, the experimental version may be approved for full deployment. Testing may be deemed complete if the experimental version has been dialed up to a sufficiently large percentage (e.g., 80% or 90%) of the request volume without causing an adverse impact on performance. Approval of the experimental version may cause the service to discontinue processing any requests according to the control version. Instead the experimental version may be used for processing of 100% of requests to the service and may now become the new control version. After the approval of the experimental version, a change to another configuration may be deployed to the fleet for testing via gradual dialup.

As shown in 770, if testing of the experimental version is to continue, then the percentage of requests exposed to the experimental version may be dialed up at each host. For example, the percentage of requests processed according to the experimental version may be increased from 10% to 20%, and the percentage of requests processed according to the control version may be decreased from 90% to 80%. This gradual dialup may be performed again and again across the fleet, and performance metrics may be collected and analyzed at each stage, until the experimental version is accepted or rejected.

Illustrative Computer System

Figure 8:
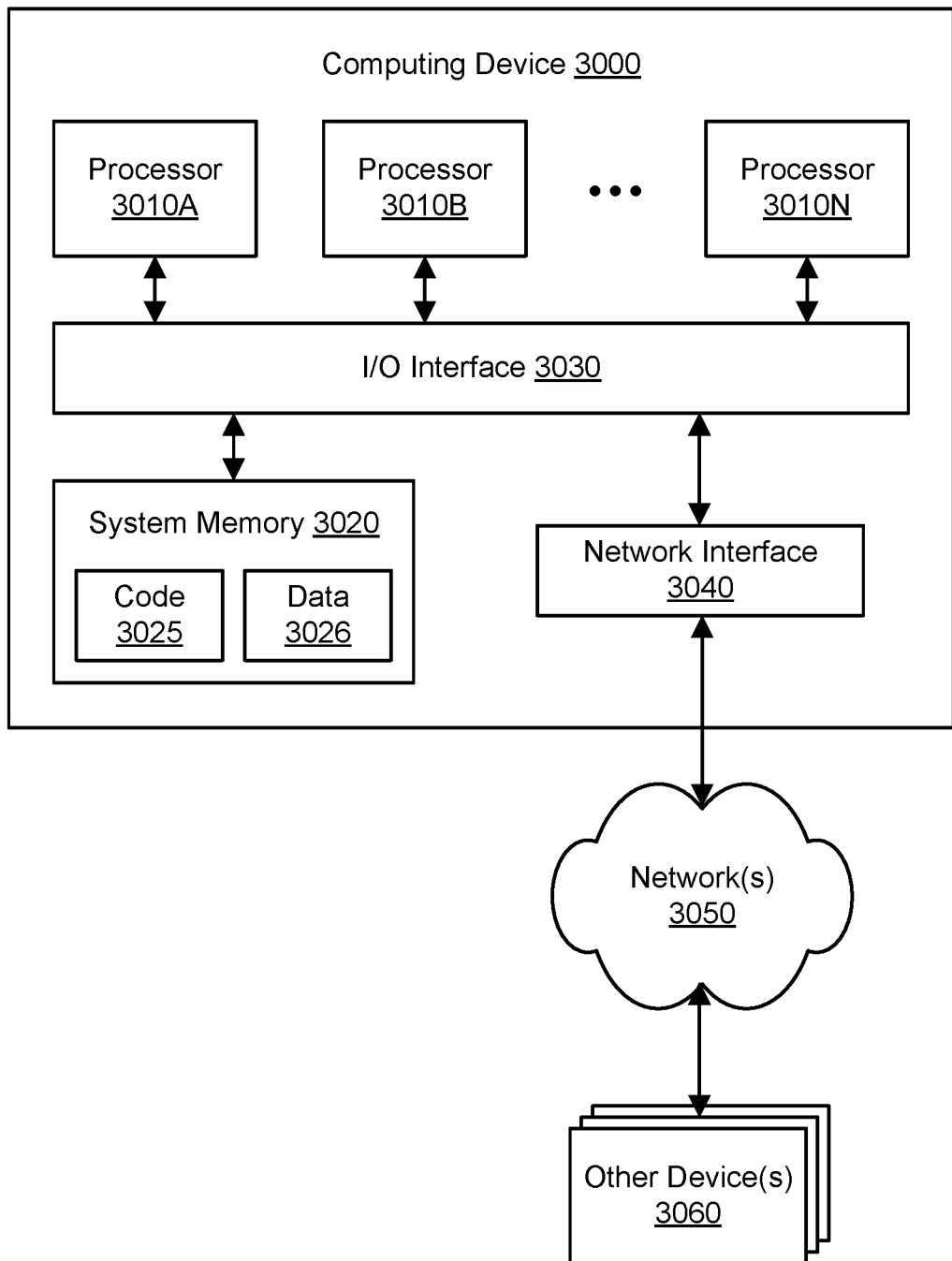
FIG. 8 illustrates an example computing device that may be used in some embodiments.

In at least some embodiments, a computer system that implements a portion or all of one or more of the technologies described herein may include a computer system that includes or is configured to access one or more computer-readable media. FIG. 8 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 8 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more processors and one or more memories that store computer-executable instructions that, when executed, cause the one or more processors to:
process a first set of requests to one or more services at a host according to a first version of a first configuration and according to a first version of a second configuration;
process a first portion of a second set of requests to the one or more services at the host according to the first version of the first configuration and according to the first version of the second configuration, and process a second portion of the second set of requests to the one or more services at the host according to a second version of the first configuration and according to the first version of the second configuration;
determine that the second version of the first configuration is rejected based at least in part on a performance of the one or more services; and
based at least in part on rejection of the second version of the first configuration, process a first portion of a third set of requests to the one or more services at the host according to the first version of the first configuration and according to the first version of the second configuration, and process a second portion of the third set of requests to the one or more services at the host according to the first version of the first configuration and according to a second version of the second configuration.

2. The system as recited in claim 1, wherein the one or more memories store additional computer-executable instructions that, when executed, cause the one or more processors to:
determine that the second version of the second configuration is approved based at least in part on the performance of the one or more services; and
based at least in part on approval of the second version of the second configuration, process a fourth set of requests to the one or more services at the host according to the first version of the first configuration and according to the second version of the second configuration.

3. The system as recited in claim 1, wherein the one or more memories store additional computer-executable instructions that, when executed, cause the one or more processors to:
determine that the second version of the second configuration is rejected based at least in part on the performance of the one or more services; and
based at least in part on rejection of the second version of the second configuration, process a fourth set of requests to the one or more services at the host according to the first version of the first configuration and according to the first version of the second configuration.

4. The system as recited in claim 1, wherein the second version of the first configuration is rejected at the host, and wherein the one or more memories store additional computer-executable instructions that, when executed, cause the one or more processors to:
provide one or more metrics associated with the performance of the one or more services to a centralized component configured to perform aggregate performance monitoring, wherein the second version of the first configuration is rejected by the centralized component for a plurality of hosts after the second version of the first configuration is rejected at the host.

5. The system as recited in claim 1, wherein the one or more memories store additional computer-executable instructions that, when executed, cause the one or more processors to:
aggregate one or more performance metrics of the one or more services from the host and one or more additional hosts, wherein the second version of the first configuration is rejected based at least in part on the performance metrics of the one or more services from the host and the one or more additional hosts.

6. The system as recited in claim 1, wherein a proportion of the second set of requests processed according to the first version of the first configuration is decreased one or more times and a proportion of the second set of requests processed according to the second version of the first configuration is increased one or more times until the second version of the first configuration is rejected.

7. A computer-implemented method, comprising:
processing a first set of requests to one or more services at a host according to a first version of a first configuration and according to a first version of a second configuration;
processing a first portion of a second set of requests to the one or more services at the host according to the first version of the first configuration and according to the first version of the second configuration, and processing a second portion of the second set of requests to the one or more services at the host according to a second version of the first configuration and according to the first version of the second configuration;
determining that the second version of the first configuration is rejected based at least in part on a performance of the one or more services; and
based at least in part on rejection of the second version of the first configuration, processing a first portion of a third set of requests to the one or more services at the host according to the first version of the first configuration and according to the first version of the second configuration, and processing a second portion of the third set of requests to the one or more services at the host according to the first version of the first configuration and according to a second version of the second configuration.

8. The method as recited in claim 7, further comprising:
determining that the second version of the second configuration is approved based at least in part on the performance of the one or more services; and
based at least in part on approval of the second version of the second configuration, processing a fourth set of requests to the one or more services at the host according to the first version of the first configuration and according to the second version of the second configuration.

9. The method as recited in claim 7, further comprising:
determining that the second version of the second configuration is rejected based at least in part on the performance of the one or more services; and
based at least in part on rejection of the second version of the second configuration, processing a fourth set of requests to the one or more services at the host according to the first version of the first configuration and according to the first version of the second configuration.

10. The method as recited in claim 7, wherein the second version of the first configuration is rejected at the host, and wherein the method further comprises:
providing one or more metrics associated with the performance of the one or more services to a centralized component configured to perform aggregate performance monitoring, wherein the second version of the first configuration is rejected by the centralized component for a plurality of hosts after the second version of the first configuration is rejected at the host.

11. The method as recited in claim 7, further comprising:
aggregating one or more performance metrics of the one or more services from the host and one or more additional hosts, wherein the second version of the first configuration is rejected based at least in part on the performance metrics of the one or more services from the host and the one or more additional hosts.

12. The method as recited in claim 7, wherein a proportion of the second set of requests processed according to the first version of the first configuration is decreased one or more times and a proportion of the second set of requests processed according to the second version of the first configuration is increased one or more times until the second version of the first configuration is rejected.

13. The method as recited in claim 7, wherein the second version of the second configuration is received by the host before the second version of the first configuration is rejected, and wherein the second version of the second configuration is queued at the host until the second version of the first configuration is rejected.

14. One or more non-transitory computer-readable storage media storing program instructions that, when executed on or across one or more processors, perform:

processing a first set of requests to one or more services at a host according to a first version of a first configuration and according to a first version of a second configuration;

processing a first portion of a second set of requests to the one or more services at the host according to the first version of the first configuration and according to the first version of the second configuration, and processing a second portion of the second set of requests to the one or more services at the host according to a second version of the first configuration and according to the first version of the second configuration;

determining that the second version of the first configuration is rejected based at least in part on a performance of the one or more services; and based at least in part on rejection of the second version of the first configuration, processing a first portion of a third set of requests to the one or more services at the host according to the first version of the first configuration and according to the first version of the second configuration, and processing a second portion of the third set of requests to the one or more services at the host according to the first version of the first configuration and according to a second version of the second configuration.

15. The one or more non-transitory computer-readable storage media as recited in claim 14, further comprising additional program instructions that, when executed on or across the one or more processors, perform:

determining that the second version of the second configuration is approved based at least in part on the performance of the one or more services; and based at least in part on approval of the second version of the second configuration, processing a fourth set of requests to the one or more services at the host according to the first version of the first configuration and according to the second version of the second configuration.

16. The one or more non-transitory computer-readable storage media as recited in claim 14, further comprising additional program instructions that, when executed on or across the one or more processors, perform:

determining that the second version of the second configuration is rejected based at least in part on the performance of the one or more services; and based at least in part on rejection of the second version of the second configuration, processing a fourth set of requests to the one or more services at the host according to the first version of the first configuration and according to the first version of the second configuration.

17. The one or more non-transitory computer-readable storage media as recited in claim 14, wherein the second version of the first configuration is rejected at the host, and wherein the one or more non-transitory computer-readable storage media further comprise additional program instructions that, when executed on or across the one or more processors, perform:

providing one or more metrics associated with the performance of the one or more services to a centralized component configured to perform aggregate performance monitoring, wherein the second version of the first configuration is rejected by the centralized component for a plurality of hosts after the second version of the first configuration is rejected at the host.

18. The one or more non-transitory computer-readable storage media as recited in claim 14, further comprising additional program instructions that, when executed on or across the one or more processors, perform:

aggregating one or more performance metrics of the one or more services from the host and one or more additional hosts, wherein the second version of the first configuration is rejected based at least in part on the performance metrics of the one or more services from the host and the one or more additional hosts.

19. The one or more non-transitory computer-readable storage media as recited in claim 14, wherein a proportion of the second set of requests processed according to the first version of the first configuration is decreased one or more times and a proportion of the second set of requests processed according to the second version of the first configuration is increased one or more times until the second version of the first configuration is rejected.

20. The one or more non-transitory computer-readable storage media as recited in claim 14, wherein the second version of the second configuration is received by the host before the second version of the first configuration is rejected, and wherein the second version of the second configuration is queued at the host until the second version of the first configuration is rejected.

* * * * *